(12) United States Patent
Ueno

(10) Patent No.: US 8,402,271 B2
(45) Date of Patent: Mar. 19, 2013

(54) USER INFORMATION PROVIDING SYSTEM

(75) Inventor: Toshihiro Ueno, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 203 days.

(21) Appl. No.: 12/803,267

(22) Filed: Jun. 23, 2010

(65) Prior Publication Data

US 2011/0004755 A1 Jan. 6, 2011

(30) Foreign Application Priority Data

Jul. 2, 2009 (JP) ................................ 2009-157826

(51) Int. Cl.
*H04L 29/06* (2006.01)
(52) U.S. Cl. ........................................... 713/168; 726/2
(58) Field of Classification Search .................... 713/168
See application file for complete search history.

(56) References Cited

U.S. PATENT DOCUMENTS

| 2005/0108530 | A1* | 5/2005 | Tonegawa | 713/170 |
| 2006/0050303 | A1* | 3/2006 | Oomori et al. | 358/1.15 |
| 2006/0064741 | A1 | 3/2006 | Terao | |
| 2006/0192990 | A1* | 8/2006 | Tonegawa | 358/1.15 |

FOREIGN PATENT DOCUMENTS

| JP | 2005-149221 A | 6/2005 |
| JP | 2006-085641 A | 3/2006 |
| JP | 2007-306398 A | 11/2007 |
| JP | 2008-083740 A | 4/2008 |

* cited by examiner

*Primary Examiner* — Edward Zee
*Assistant Examiner* — Yogesh Paliwal
(74) *Attorney, Agent, or Firm* — Edwards Wildman Palmer LLP; David G. Conlin; Steven M. Jensen

(57) ABSTRACT

In the system, when the service providing apparatus is used through the multi-functional peripheral, user authentication is performed and user information is provided to the service providing apparatus, and the authenticating apparatus holds authentication information and user information associating each information with identification information of a user, performs user authentication based on the input of the authentication information of the user for the multi-functional peripheral, transmits the identification information of the user to the multi-functional peripheral by authentication, and is allowed access to the service providing apparatus through the multi-functional peripheral by receiving the identification information, and the service providing apparatus, by receiving a service request from the multi-functional peripheral and the identification information, transmits the identification information to the authenticating apparatus, and thereby obtains user information transmitted from the authenticating apparatus.

8 Claims, 11 Drawing Sheets

USER INFORMATION STORAGE PORTION

| USER IDENTIFIER | USER NAME | PASSWORD | DISPLAY NAME | ELECTRONIC MAIL ADDRESS |
|---|---|---|---|---|
| 00001 | aida | Aidapass | AIDA | aida@exsample.com |
| 00002 | itou | Itoupass | ITOU | itou @exsample.com |
| 00003 | uno | Unopass | UNO | uno @exsample.com |
| ⋮ | ⋮ | ⋮ | ⋮ | ⋮ |

FIG. 7A

```
<USER INFORMATION OBTAINING REQUEST>
  <ITEM INFORMATION>
    <ITEM name = "DISPLAY NAME"/>
    <ITEM name = "MAIL ADDRESS"/>
  </ITEM INFORMATION>
</USER INFORMATION OBTAINING REQUEST>
```

ITEM INFORMATION: the <ITEM INFORMATION>...</ITEM INFORMATION> block

FIG. 7B

```
<USER INFORMATION OBTAINING RESPONSE>
  <IDENTIFIER>00001</IDENTIFIER>
  <ITEM INFORMATION>
    <ITEM name = "DISPLAY NAME">AIDA</ITEM>
    <ITEM name = "MAIL ADDRESS">aida@exsample.com</ITEM>
  </ITEM INFORMATION>
</USER INFORMATION OBTAINING RESPONSE >
```

USER ID: <IDENTIFIER>00001</IDENTIFIER>
ITEM INFORMATION: the <ITEM INFORMATION>...</ITEM INFORMATION> block

USER INFORMATION PROVIDING SYSTEM

CROSS-NOTING PARAGRAPH

This Non-provisional application claims priority under 35 U.S.C. §119 (a) on Patent Application No. 2009-157826 filed in JAPAN on Jul. 2, 2009, the entire contents of which are hereby incorporated herein by reference.

FIELD OF THE INVENTION

The present invention relates to a user information providing system to which a digital multi-functional peripheral having functions of copying, printing, a scanner, a facsimile, etc., and one or more service providing apparatuses which provide a service operating in cooperation with the digital multi-functional peripheral are connected, and relates to concealing of authentication information and sharing of user information for the service providing apparatus.

BACKGROUND OF THE INVENTION

Conventionally, unification of authentication processing and utilization of a service by single sign-on have been promoted for a plurality of services which exist on a network. For example, an integrated log-in service which makes it possible to use services of other servers by verifying that it is authenticated by a specified server based on confidence between Windows (registered trademark) servers, is provided.

In addition, a digital multi-functional peripheral described in Japanese Laid-Open Patent Publication No. 2008-83740 stores authentication information inputted to a digital multi-functional peripheral and authentication information for a server which is used from the digital multi-functional peripheral in association with each other, and when using the server after finishing authentication by the digital multi-functional peripheral, authentication is performed by using the authentication information for the server associated with the authentication information inputted to the digital multi-functional peripheral.

Moreover, a concept such as SaaS (Software as a Service) which provides a function of an application as a service through a network has become widespread, a scene of using an application on an application server from a digital multi-functional peripheral appears, and means for connecting from the digital multi-functional peripheral to the application server is provided by the digital multi-functional peripheral.

However, in the digital multi-functional peripheral of Japanese Laid-Open Patent Publication No. 2008-83740, authentication information and user information are stored inside the digital multi-functional peripheral, and therefore, maintenance cost increases because these pieces of information need to be registered and updated in the digital multi-functional peripheral when digital multi-functional peripherals using an authentication server and servers used from the digital multi-functional peripherals increase.

Furthermore, the digital multi-functional peripheral is able to use authentication information held in itself when accessing the application server, however, when an entity of a function exists on an application server like in the case of the Saas, authentication processing is executed on an application server side, and therefore, it is necessary to convey authentication information of a user to the application server from the digital multi-functional peripheral.

Additionally, in a case where a plurality of services are used in combination with each other, since not all services necessarily provide integrated authentication, it is necessary to provide an authentication method according to each service.

On the other hand, it is not preferable to deliver authentication information or individual information to an unspecific large number of applications from the standpoint of individual information protection.

Furthermore, the same user, when using different digital multi-functional peripherals, wishes to operate them in the same operability, and therefore, it is desirable that his/her authentication information or individual information is shared even when using different digital multi-functional peripherals.

SUMMARY OF THE INVENTION

An object of the present invention is to provide a user information providing system which conceals authentication information of a user and shares user information for a service providing apparatus which provides a service operating in cooperating with a digital multi-functional peripheral.

A user information providing system of the present invention includes a plurality of multi-functional peripherals, a service providing apparatus which works with a multi-functional peripheral, and an authenticating apparatus which performs user authentication, which are connected through a network, and when the service providing apparatus is used through the multi-functional peripheral, user authentication is performed and user information is provided to the service providing apparatus, wherein the authenticating apparatus holds authentication information of the user and user information associating with identification information of a user in advance, performs user authentication based on the input of authentication information of a user for the multi-functional peripheral, transmits the identification information of the user to the multi-functional peripheral by authentication, and is allowed access to the service providing apparatus through the multi-functional peripheral by receiving the identification information, and the service providing apparatus transmits the identification information to the authenticating apparatus through the multi-functional peripheral by receiving a service request from the multi-functional peripheral and the identification information, and thereby obtains user information transmitted from the authenticating apparatus through the multi-functional peripheral.

In the above-described user information providing system, when the service is "image reading and transmitting service", the service providing apparatus obtains an electronic mail address of a user transmitted from the authenticating apparatus through the multi-functional peripheral and an electronic mail address of a transmitting destination, sets a transmitter address of image reading and transmitting service to the electronic mail address of the user, and transmits image data read from the multi-functional peripheral to the electronic mail address of the transmitting destination by transmitting the identification information to the authenticating apparatus through the multi-functional peripheral.

Here, as for an electronic mail address of the user, the authenticating apparatus obtains an electronic mail address of a user from an LDAP server based on user account information corresponding to the identification information.

The above-described user information providing system may be configured as follows.

(1) The service providing apparatus holds item information which identifies an item which is required by the service providing apparatus, and when requesting user information, transmits the identification information of the user and the item information to the multi-functional peripheral, and the multi-functional peripheral extracts user information corresponding to the item information from user information received from the authenticating apparatus, and sends it back to the service providing apparatus.

(2) The service providing apparatus holds item information which identifies an item which is required by the service providing apparatus, and when requesting user information, transmits the identification information of the user and the item information to the authenticating apparatus through the multi-functional peripheral, and the authenticating apparatus extracts user information corresponding to the item information from user information related to identification information of the user received from the service providing apparatus, and sends it back to the service providing apparatus through the multi-functional peripheral.

(3) The service providing apparatus, when requesting user information, further transmits service identification information which identifies a service which is provided by the service providing apparatus together with the identification information of the user to the authenticating apparatus through the multi-functional peripheral, and the authenticating apparatus further holds service identification information which is accessible by a user by associating with identification information of the user in advance, and when the service identification information received from the service providing apparatus is held in association with the identification information of the user, sends back user information related to the identification information of the user to the service providing apparatus through the multi-functional peripheral.

Furthermore, the configuration of the above-described (3) may be configured as follows.

(3-1) The above described authenticating apparatus holds an item to be provided corresponding to a service by associating with service identification information in advance, and when service identification information received from the service providing apparatus is held in association with the identification information of the user, extracts an item associated with the service identification information from user information related to the identification information of the user, and sends it back to the service providing apparatus through the multi-functional peripheral.

(3-2) The service providing apparatus holds item information which identifies an item which is required by the service providing apparatus, and when requesting user information, further transmits the item information to the multi-functional peripheral, and the multi-functional peripheral extracts user information corresponding to the item information from user information received from the authenticating apparatus, and sends it back to the service providing apparatus.

(3-3) The service providing apparatus holds item information which identifies an item which is required by the service providing apparatus and when requesting user information, further transmits the item information to the authenticating apparatus through the multi-functional peripheral, and the authenticating apparatus extracts user information corresponding to the item information from user information related to identification information of the user received from the service providing apparatus, and sends it back to the service providing apparatus through the multi-functional peripheral.

BRIEF DESCRIPTION OF THE DRAWINGS

FIG. 7A and FIG. 7B are diagrams showing examples of a specified format when specifying an item of user information and an obtaining format of obtained user information;

PREFERRED EMBODIMENTS OF THE INVENTION

Description will hereinafter be given for an embodiment according to a user information providing system of the present invention with reference to the drawings.

Figure 1:
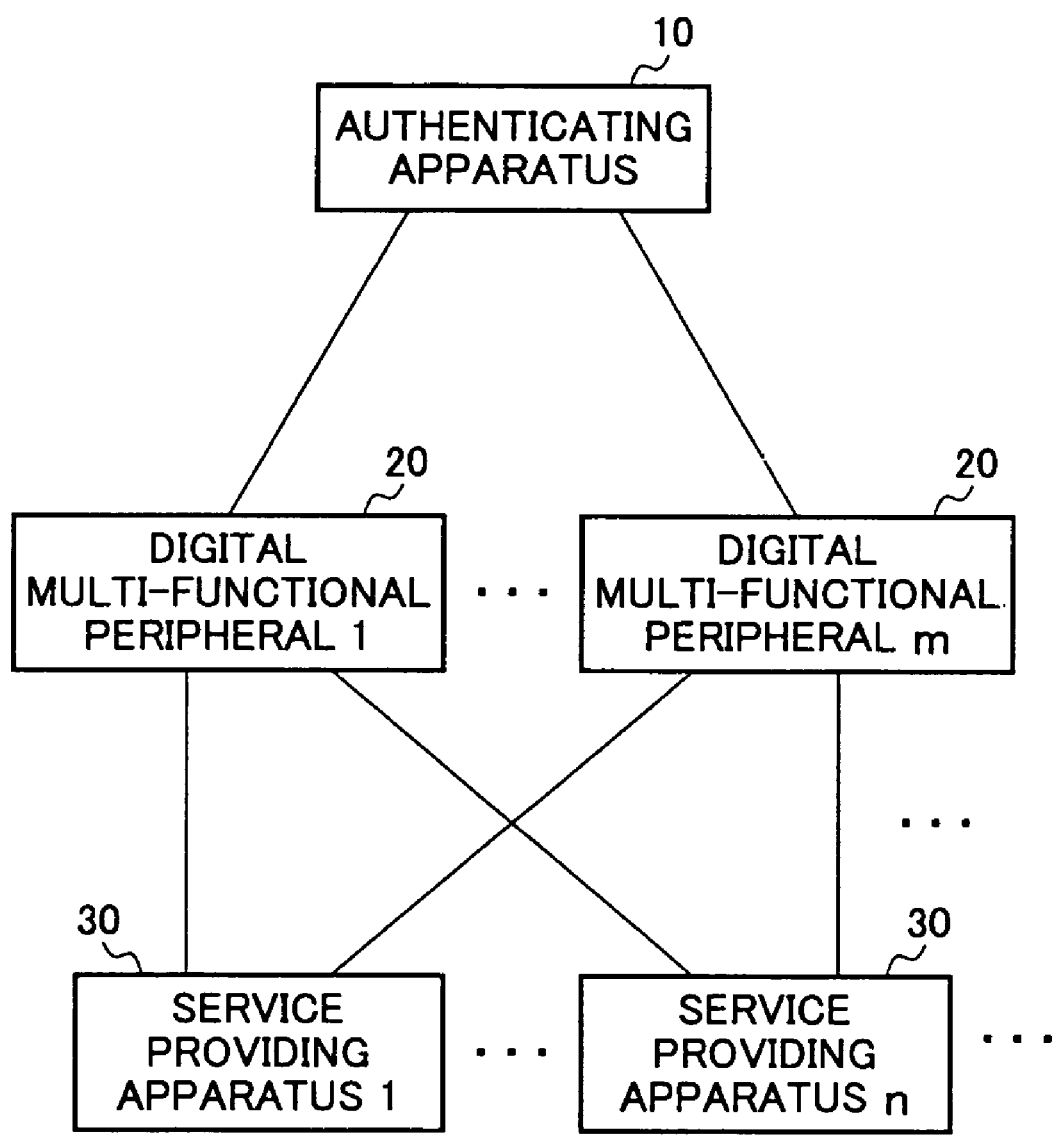
FIG. 1 is a diagram showing a connection environment of a user information providing system of the present invention.

FIG. 1 is a diagram showing a connection environment of a user information providing system of the present invention, where one or more digital multi-functional peripherals 20, an authenticating apparatus 10, and one or more service providing apparatuses 30 which provide a service operating in cooperation with the digital multi-functional peripheral 20 are connected through a network such as LAN (Local Area Network).

The authenticating apparatus 10 is comprised of an authentication application which operates on a server computer, holds authentication information of the user and user information when using the service providing apparatus for each user, and sends back a processed result respectively for a request of user authentication and user information from the digital multi-functional peripheral 20.

Figure 2:
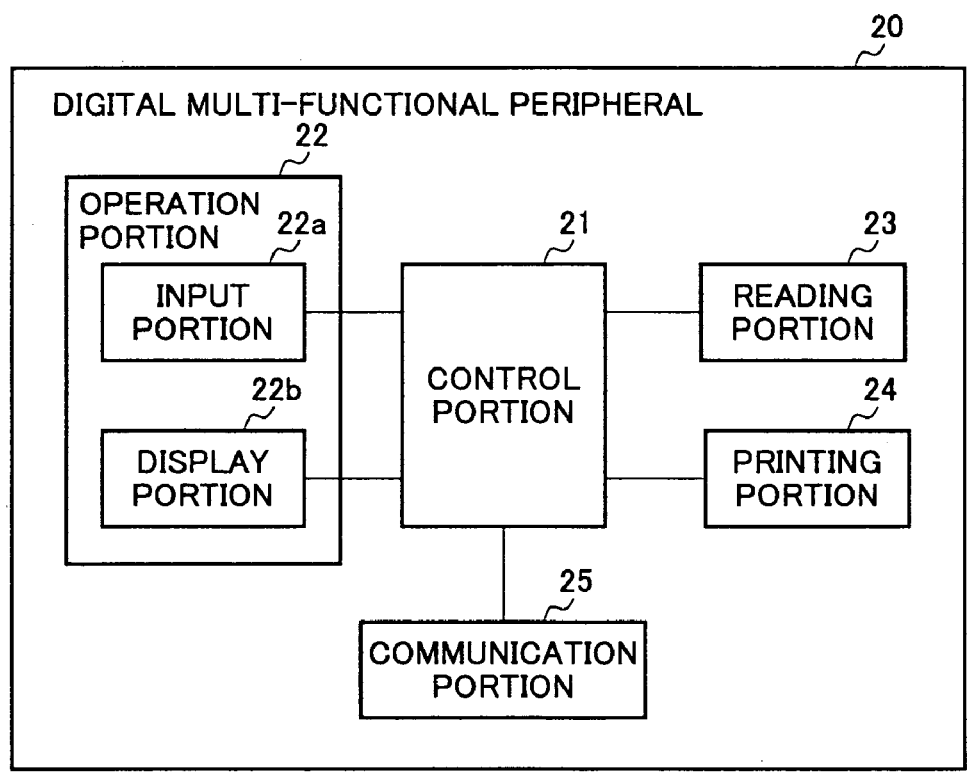
FIG. 2 is a block diagram showing an internal configuration of a digital multi-functional peripheral to which the present invention is applied.

The digital multi-functional 20 is a multi-functional image forming apparatus which is generally called an MFP (Multi Function Peripheral), and as illustrated in FIG. 2, has a control portion 21, an operation portion 22, a reading portion 23, a printing portion 24, and a communication portion 25.

The control portion 21 controls the whole of the digital multi-functional peripheral. For example, when the user uses the digital multi-functional peripheral, control is performed so that the name and the password of the user are inputted from the operation portion 22 and the obtained name and password of the user are supplied to the authenticating apparatus 10 to be authenticated.

In addition, when the user wishes to make a copy of a document, control is performed so that a copy instruction is received from the operation portion 22, an instruction to read the document is given to the reading portion 23, electronic data of the document is obtained by the reading portion 23, and the electronic data is transmitted to the printing portion 24 to be printed.

Furthermore, after activating the service providing apparatus 30 which operates in cooperation by the instruction from the operation portion 22, control is performed so that user information requested from the service providing apparatus 30 is obtained from the authenticating apparatus 10 to be sent back.

The operation portion 22 is comprised of an input portion 22a having a key, a touch panel, and the like, and a display portion 22b having an LED (Light-Emitting Diode), an LCD (Liquid Crystal Display), or the like. The user performs each operation at the input portion 22a while viewing display of the display portion 22b, and is thereby able to operate each member of the digital multi-functional peripheral 20 in such a manner as performing functions of copying, scanning, facsimile communication, and the like, for example.

The reading portion 23 is a unit, for example a scanner, etc., for reading an image and is capable of scan-reading of a large number of sheets using horizontal scan-reading of a document, an ADF (Auto Document Feeder). The reading portion 23 reads the document, makes an image into electronic data, and transfers the image made into the electronic data to the control potion 21.

The printing portion 24 is a printer, has a system of laser, ink-jet, or the like, and is able to output visible record to a medium such as paper. For example, the control portion 21 converts print data transmitted through a network into printable data in the printing portion 24, and based on the converted data, the electronic data is printed and reproduced on the paper.

The communication portion 25, using TCP/IP (Transmission Control Protocol/Internet Protocol), is able to transmit electronic data, an inquiry, transfer data, or the like from the control portion 21 to the authenticating apparatus 10 and the service providing apparatus 30 which are connected to the network, and receive return information from each apparatus.

The service providing apparatus 30 is comprised of a service application which operates on the server computer and is capable of communication through the network, operates according to an operation request from the digital multi-functional peripheral 20, makes an inquiry to the digital multi-functional peripheral 20, and obtains necessary user information to execute the function. The service application includes, for example, transmitting an electronic mail with image data scanned by the digital multi-functional peripheral 20 attached thereto, filing to a file server, or the like. Additionally, a plurality of service providing apparatuses 30 may operate on one server computer.

Next, brief description will be given for an operation of the user information providing system.

Although description will hereinafter be given for an example in which "a user transmits a scanned image of a document by an electronic mail" in the specification, if this description is easily applicable to the other cases.

Prior to starting to use the digital multi-functional peripheral 20, the user makes his/her authentication information (user name and password), his/her display name and electronic mail address correspond to a user identifier (user ID) to record them in the authenticating apparatus 10.

Next, when the user inputs his/her user name and password on an authentication screen of the digital multi-functional peripheral 20, the digital multi-functional peripheral 20 transmits the inputted user name and password to the authenticating apparatus 10 to be authenticated.

The authenticating apparatus 10 sends back user ID in a case where the transmitted user name and password have been recorded, and sends back an error in the case of not being recorded.

When the user ID is sent back from the authenticating apparatus 10, the digital multi-functional peripheral 20 displays the operation screen of the multi-functional peripheral, and temporarily stores the user ID until the user finishes using the multi-functional peripheral.

Additionally, when the error is sent back from the authenticating apparatus 10, a message to the effect that the multi-functional peripheral is not usable is displayed, and an operation other than authentication is not received.

Next, the user selects a "ScanToEmail" function, places the documents on the ADF, and presses a start key.

When receiving a "ScanToEmail" instruction, the digital multi-functional peripheral 20 instructs the reading portion 23 to read the document, and transmits electronic data of the document read by the reading portion 23 and the user ID to the service providing apparatus 30 which executes a service application for sending out an electronic mail.

The service providing apparatus 30 starts the service application for sending out an electronic mail and transmits the received user ID to the digital multi-functional peripheral 20, and thereby requests user information (a display name and an electronic mail address of the user) which is necessary for sending out the electronic mail.

The digital multi-functional peripheral 20 transmits the received user ID to the authenticating apparatus 10 to request the user information.

The authenticating apparatus 10 sends back user information (a display name and an electronic mail address of the user) corresponding to the transmitted user ID, and the digital multi-functional peripheral 20 transfers the user information to the service providing apparatus 30.

The service providing apparatus 30, using the transmitted user information (a display name and an electronic mail address of the user), generates an electronic mail with the electronic data of the document which had been previously transmitted added thereto to transmit toward a mail server.

As described above, since authentication information and individual information of the user are integrally managed by the authenticating apparatus and these pieces of information can be used only through the digital multi-functional peripheral, the authentication information is concealed from the service providing apparatus and even though the service providing apparatus is operated from any digital multi-functional peripheral, the same user information is usable.

Description will hereinafter be given in detail for a configuration and an operation of the user information providing system of the present invention.

<First Embodiment>

Figure 3:
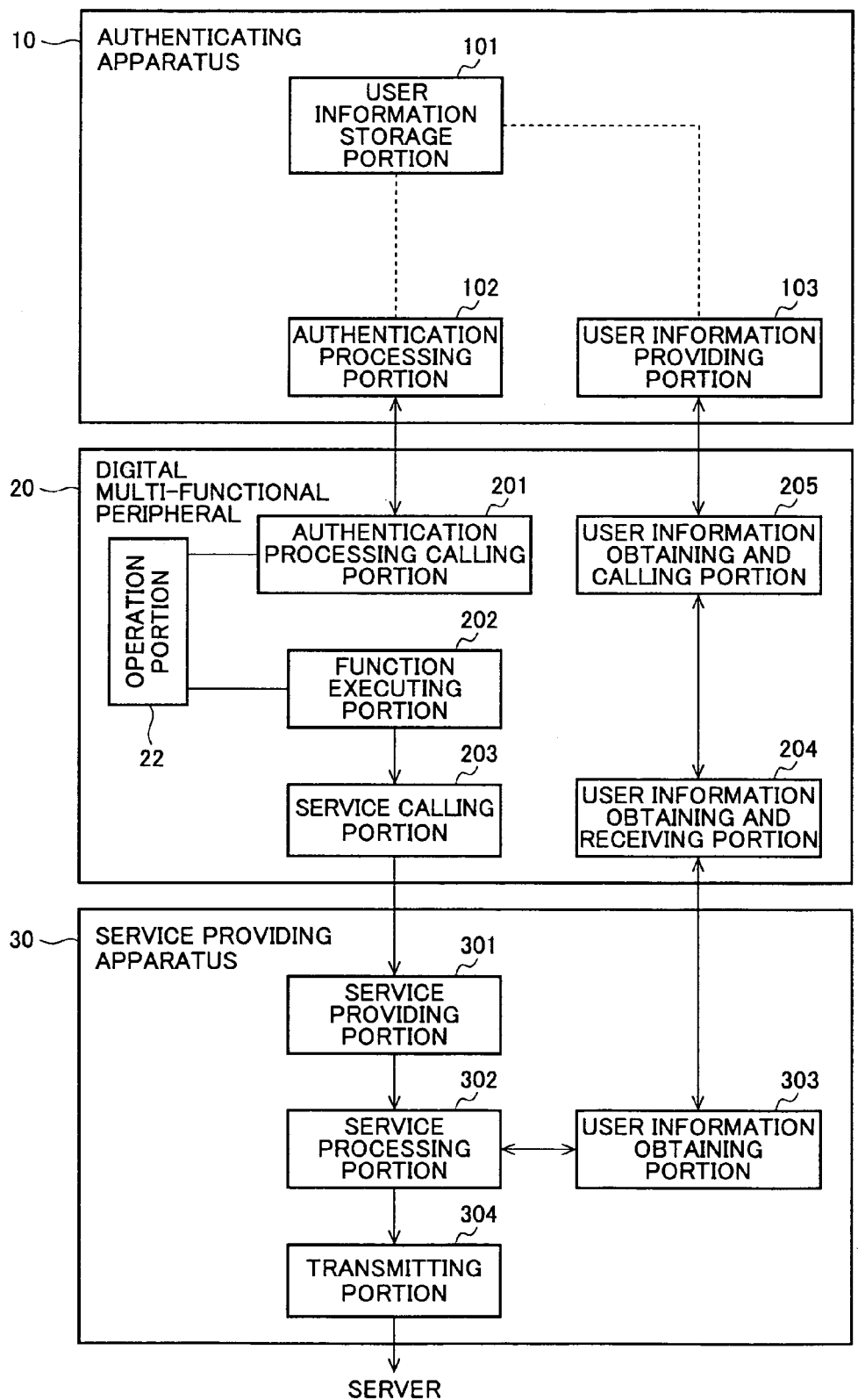
FIG. 3 is a block diagram showing a detailed configuration of the user information providing system according to a first embodiment of the present invention.

FIG. 3 is a block diagram showing a detailed configuration of the user information providing system according to the present embodiment. In FIG. 3, the authenticating apparatus 10 is configured to include a user information storage portion 101, an authentication processing portion 102, and a user information providing portion 103.

Figure 4:
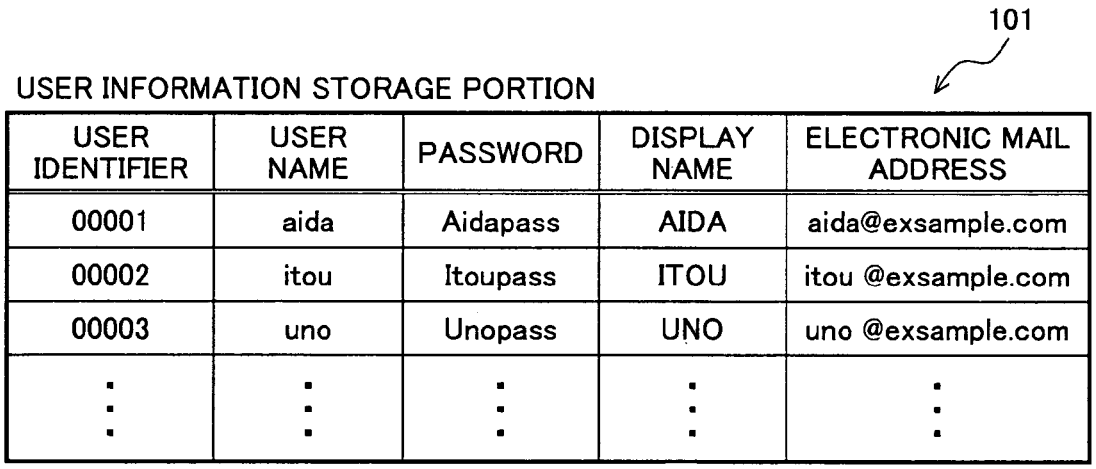
FIG. 4 is a diagram showing an example of a storage content of a user information storage portion.

The user information storage portion 101 is comprised of a file in a file system, various types of databases represented by a relational database, etc., and as illustrated in FIG. 4, the authenticating apparatus 10 stores authentication information of the user which allows access to various types of services and user information associating with the user identifier (user ID).

Here, the user identifier is an identifier for uniquely identifying the user inside the authenticating apparatus 10 and is indicated as a five-digit number in FIG. 4, but is not limited thereto.

The authentication information of the user is indicated as a user name and a password in FIG. 4, but is not limited thereto.

The user information is the information for each user to be provided to the service application, and is a display name and an electronic mail address of a user in the case of an electronic mail service. Additionally, the user information may be stored for each of different services in a case where there are a plurality of services, or stored for all the services in common.

The authentication processing portion 102 receives the authentication information of the user (user name and password) from the digital multi-functional peripheral 20 through the network, determines whether there is one of a combination which coincides with the received authentication information out of authentication information of each user which is held in the user information storage portion 101, and, when there is one coinciding therewith, returns the user identifier (user ID) to the digital multi-functional peripheral 20. Additionally, the authentication processing portion 102 returns an error to the digital multi-functional peripheral 20 that originated the call when coinciding authentication information is not recorded.

A method of calling the authenticating apparatus 10 from the digital multi-functional peripheral 20 and a method of sending back includes various methods of remote procedure call such as a Web service by a SOAP message based on XML or request transmission by HTTP-POST, but not limited thereto. Additionally, a call method between the digital multi-functional peripheral 20 and the service providing apparatus 30 and a method of sending back which will be described below are performed with a similar approach.

Figure 5:
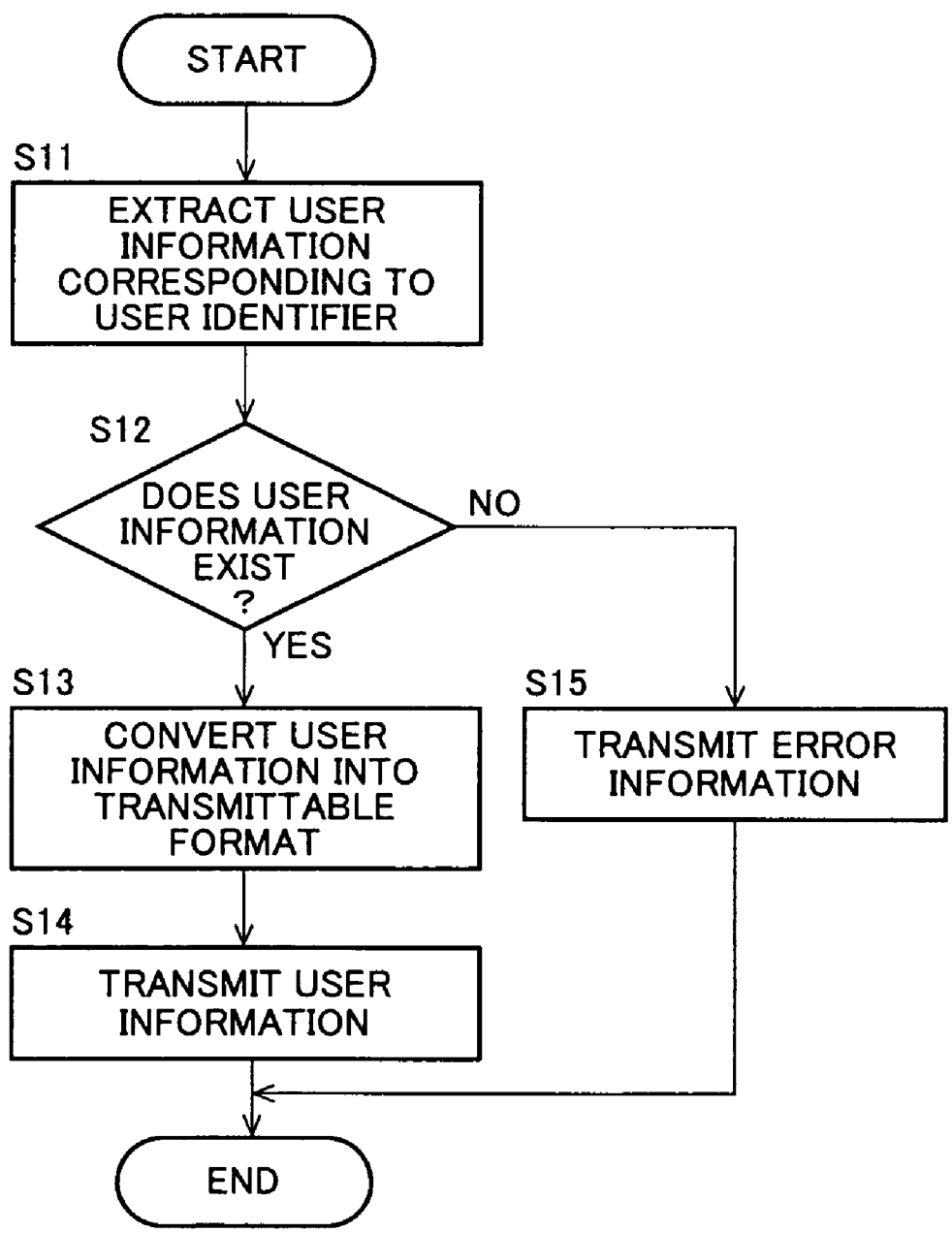
FIG. 5 is a flowchart showing an operation of a user information providing portion.

The user information providing portion 103 receives the user ID which had been delivered in the authentication processing portion 102 from the digital multi-functional peripheral 20 through the network, extracts every user information associated with the user ID from the user information storage portion 101 and returns to the source of the call. Description will be given for an operation of the user information providing portion 103 using the flowchart of FIG. 5.

First, every user information associated with the user identifier (user ID) called and received from the digital multi-functional peripheral 20 are extracted from the user information storage portion 101 (step S11).

At the time, when user information does not exist, (in the case of NO at step S12), an error to the effect that the corresponding user or data does not exist is reported to the digital multi-functional peripheral 20 that originated the call (step S15).

On the other hand, when the user information exists (in the case of YES at step S12), the extracted user information is converted to a format which is conveyable by the network (step S13). At this time, the format to be converted depends upon a communication system at the time of response, and for example, in the case of the Web service by the SOAP, conversion is performed to character string expression by the XML (see FIG. 7 described below).

The converted user information is sent back to the digital multi-functional peripheral 20 as a response to calling (step S14).

Next, the digital multi-functional peripheral 20 is configured to include an authentication processing calling portion 201, a function executing portion 202, a service calling portion 203, a user information obtaining and receiving portion 204, and a user information obtaining and calling portion 205 in FIG. 3.

The digital multi-functional peripheral 20 normally displays an input screen of authentication information of the user for log-in on the display portion 22b, and the user, when using the digital multi-functional peripheral 20, uses the input portion 22a to input authentication information of the user (user name and password) to the input screen of the authentication information of the user.

The control portion 21 receives the input of the authentication information of the user, starts the authentication processing calling portion 201 to pass the authentication information of the user.

The authentication processing calling portion 201 calls the authenticating apparatus 10 (authentication processing portion 102) through the network, transmits the authentication information of the user delivered from the control portion 21 to the authenticating apparatus 10 and receives a result of performing authentication processing from the authenticating apparatus 10.

When the result of performing authentication processing is a user ID, the multi-functional peripheral temporarily stores the user ID until the user finishes using the multi-functional peripheral, returns to the control portion 21 to display an operation screen of the digital multi-functional peripheral. The temporarily stored user ID is deleted from temporary storage when the user finishes using the multi-functional peripheral (for example, it is assumed that the use is finished in the case of power source-off, log-out, and when there is no operation even after predetermined time has passed).

Additionally, when the result of performing the authentication processing is an error, a message to the effect that the multi-functional peripheral is not usable is displayed on the display portion 22b, and the control portion 21 does not receive an operation other than authentication.

Next, when the user wishes to execute a function of the multi-functional peripheral, the user selects and inputs an execution function on an operation screen which is displayed on the display portion 22b at the input portion 22a.

On receipt of the function selecting input, concerning the function that is not accompanied by execution of a service (for example, a case of only copying or printing), the control portion 21 starts the function executing portion 202 so that the function which the user selected is executed, and the display is returned to the operation screen.

On the other hand, for the selected function which is the function accompanied by execution of a service (for example, "ScanToEmail" or a registration function to a file server), the function executing portion 202 is started to execute the function which the user selected, and thereafter a type of the service is given to the service calling portion 203.

On receipt of the start of the service from the control portion 21, the service calling portion 203 calls the service providing apparatus 30 (service providing portion 301) corresponding to the type of the service to give a processing result in the function executing portion 202 and a user ID, and the display is returned to the operation screen.

On receipt of the call from the service providing apparatus 30 (user information obtaining portion 303), the user information obtaining and receiving portion 204 gives the user ID to a user information obtaining and calling portion 205 to request user information related to the user ID.

After that, the user information obtaining and receiving portion 204 transmits the user information which is given from the user information obtaining and calling portion 205 to the service providing apparatus (user information obtaining portion 303) which is a request source, so that the user information which is currently logged in is provided to the service providing apparatus 30.

The user information obtaining and calling portion 205 gives the user ID given from the user information obtaining and receiving portion 204 to the authenticating apparatus 10 (user information providing portion 103). Thereafter, the user information received from the authenticating apparatus 10 (user information providing portion 103) is given to the user information obtaining and receiving portion 204.

Next, in FIG. 3, the service providing apparatus 30 is configured to include a service providing portion 301, a service processing portion 302, a user information obtaining portion 303, and a transmitting portion 304.

On receipt of a notification of starting of a service from the digital multi-functional peripheral 20 (service calling portion 203), the service providing portion 301 starts the service processing portion 302 to give the received user ID.

For obtaining a transmitting destination of data, the service processing portion 302 calls the user information obtaining portion 303 to give the user ID.

The user information obtaining portion 303 calls the digital multi-functional peripheral 20 (user information obtaining and receiving portion 204) to give the user ID, and returns user information obtained as the result to the service processing portion 302.

The service processing portion 302 takes a necessary item out of the received user information to form a message to be transmitted, which is transmitted to an external server from the transmitting portion 304. For example, when the service is a transmission of an electronic mail, a message with electronic data of a document to be transmitted attached thereto is formed based on the received user information (a display name, an electronic mail address) and transmitted toward a mail server from the transmitting portion 304.

In this manner, in the digital multi-functional peripheral 20, as the user information in utilizing the present system, only the user ID obtained from the authenticating apparatus 10 is held as temporary information, and since the service providing apparatus inquires the user information of the digital multi-functional peripheral 20 as the occasion demands, giving and receiving of the user information is completed without direct communication between the authenticating apparatus 10 and the service providing apparatus 30.

Therefore, the authentication information of the user is concealed for the service providing apparatus and the user information is shared in the service providing apparatuses which operate in conjunction with different digital multi-functional peripherals.

A specific example utilizing the present invention is described below.

(1) When the service is "ScanToEmail":

In the user information storage portion 101 of the authenticating apparatus 101, "connecting information of a mail server (for example, a server name, and an electronic mail address)" is set as "user information related to an authenticated user".

The service providing apparatus 30 obtains an electronic mail address of a user himself/herself from the authenticating apparatus 10, and replaces a transmitter address of scanned image data with the electronic mail address of the user himself/herself from an electronic mail address unique to the digital multi-functional peripheral 20 for transmitting to a transmitting destination.

In this manner, transmitting the scanned image by an electronic mail or transmitting an electronic mail using a mail server which is specific for each user is possible by using an electronic mail address that the user uses on a PC for an individual use.

Furthermore, the authenticating apparatus 10 accesses an LDAP server based on a user account which is stored in the user information storage portion 101 to obtain an electronic mail address of the user himself/herself without setting the "connecting information of a mail server (for example, a server name, an electronic mail address)" in the user information storage portion 101 of the authenticating apparatus 10, as described above.

When this is performed, since the LDAP server which integrally manages electronic mail addresses of users is used, there will be no need to manage the electronic mail addresses by the authenticating apparatus 10, and an updated electronic mail address can be obtained.

Conventionally, when scanned data is transmitted from the digital multi-functional peripheral 20, the digital multi-functional peripheral 20 is set to be a transmitter in general, and it is hard to find who the true transmitter is from the address at a glance for a user who received the data, however, this will be solved according to the present invention.

(2) When the service is "ScanToSMB" and the authenticating apparatus is a server corresponding to "Active Directry":

In this case, an external server in FIG. 3 is replaced with a file server and the transmitting portion 304 is replaced with a ScanToSMB transmitting portion.

When a service is one using domain information of "Active Directry", the authenticating apparatus 10 obtains credential information (TGT) from an Active Directry server to use as "authentication information of the user related to the authenticated user".

In the ScanToSMB service, it is possible to access a file server using the credential information (TGT) and cause the scanned data to be stored in a folder provided in a file server with user authority.

Moreover, according to the present invention, even though the service is not corresponding to Active Directry, a file server in a domain of Active Directry can be used as a storage destination of the scanned data.

<Second Embodiment>

Figure 6:
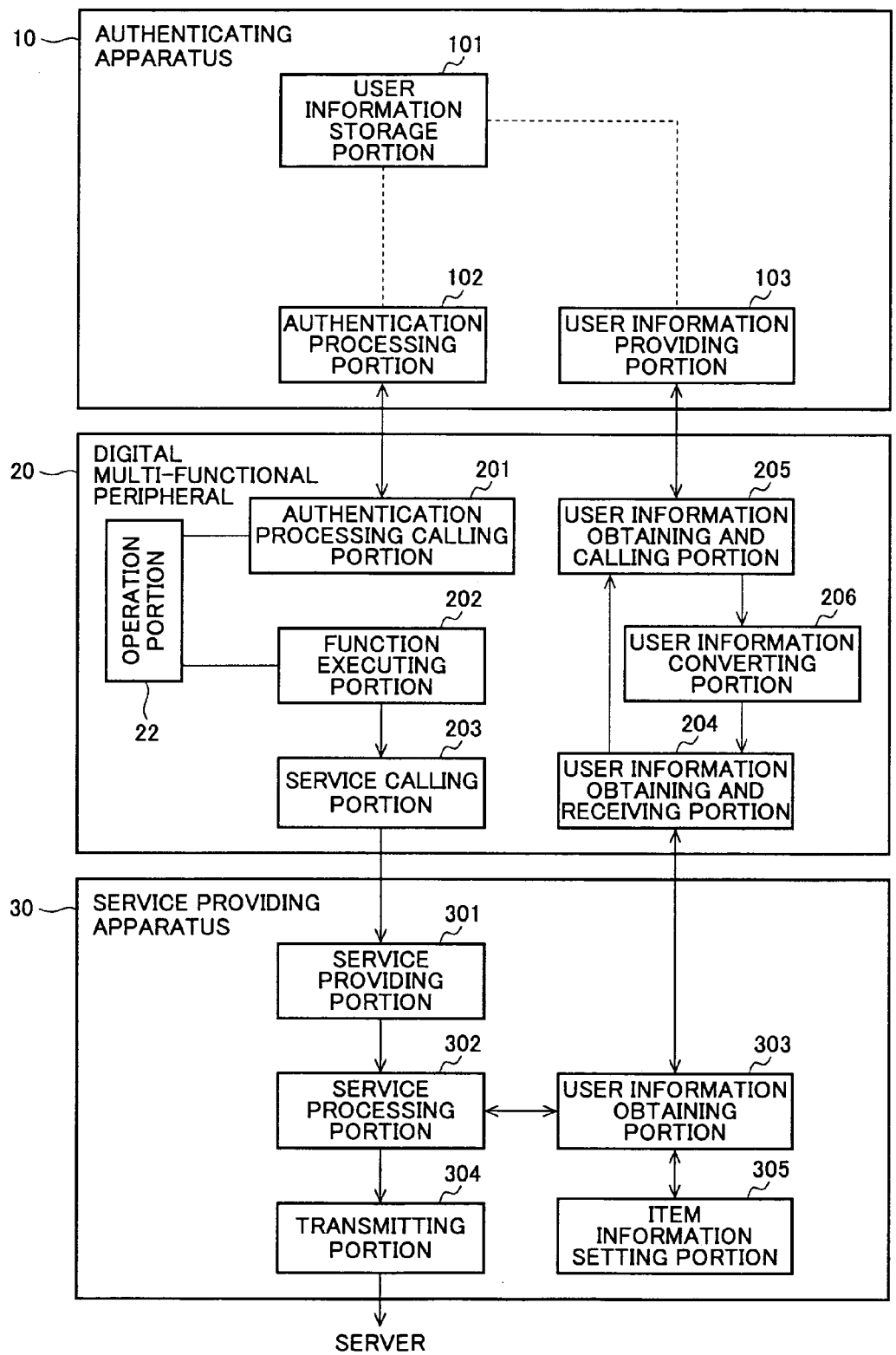
FIG. 6 is a block diagram showing a detailed configuration of the user information providing system according to a second embodiment of the present invention.

FIG. 6 is a block diagram showing a detailed configuration of the user information providing system according to the present embodiment. The configuration of the present embodiment is that, for the configuration of the first embodiment, a user information converting portion 206 is added to the digital multi-functional peripheral 20, and an item information setting portion 305 is added to the service providing apparatus 30, and the same reference number is attached to one having the same function as that of the first embodiment, and the description thereof is omitted and the difference is to be described.

In the service providing apparatus 30, in requesting the user information from the user information obtaining portion 303, the item information setting portion 305 is called from the user information obtaining portion 303 to obtain a list of item names of the user information which is required by the service application which operates in the service providing apparatus 30 to add to the user ID and the digital multi-functional peripheral 20 (user information obtaining and receiving portion 204) is called.

The item information setting portion 305 causes the user information storage portion 101 to store the user information while unifying the item names, and generates the list of item names of the user information required by the service application in an XML format shown in FIG. 7A, for example.

After that, the user information obtaining portion 303, when receiving the user information of the requested item in the XML format as shown in FIG. 7B from the digital multi-functional peripheral 20 (user information obtaining and receiving portion 204), gives the user information to the service processing portion 302.

The user information obtaining and receiving portion 204 of the digital multi-functional peripheral 20 gives the user ID to the user information obtaining and calling portion 205 and also gives the list of item names of the user information to the user information converting portion 206.

The user information obtaining and calling portion 205 requests the user information relating to the user ID from the authenticating apparatus 10 (user information providing portion 103) and receives every returned user information and gives it to the user information converting portion 206.

The user information converting portion 206 removes an item not included in the list of item names given from the user information obtaining and receiving portion 204 out of the user information received from the user information obtaining and calling portion 205, so that conversion to only the information which is required by the service application side is performed (FIG. 7B) to return to the user information obtaining and receiving portion 204.

The user information obtaining and receiving portion 204 sends back the received user information to the service providing apparatus 30 (user information obtaining portion 303).

Thereby, although a data amount of user information obtaining request between the service providing apparatus and the digital multi-functional peripheral 20 increases, even though more items of the user information are managed by the authenticating apparatus 10, only the information required by the service application is given to the service providing apparatus 30, the amount of information that is transmitted to the network is reduced, and it is possible to avoid a problem in the service application caused by transmitting unexpected data to the service providing apparatus 30 side or a problem of information leakage.

<Third Embodiment>

Figure 8:
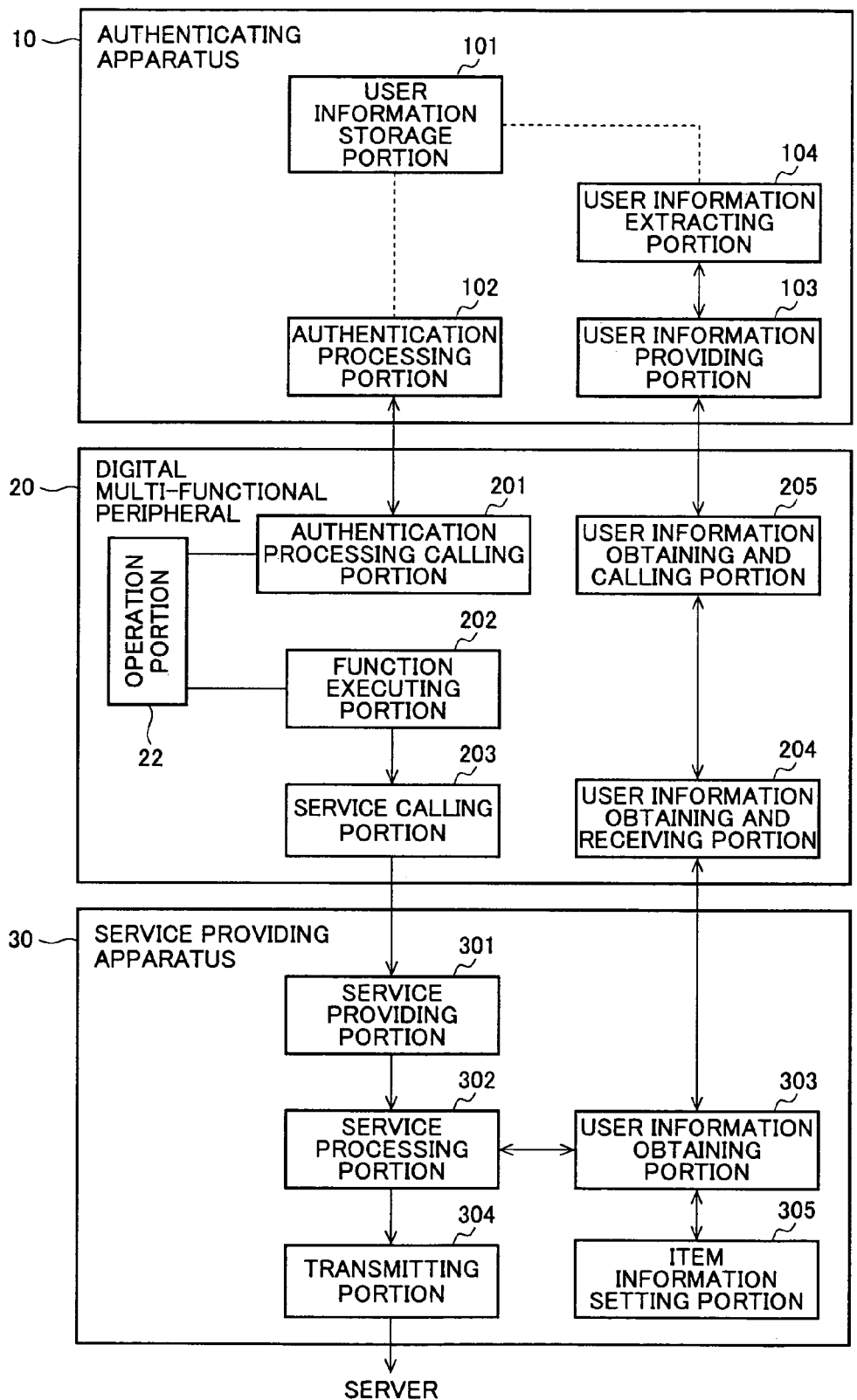
FIG. 8 is a block diagram showing a detailed configuration of the user information providing system according to a third embodiment of the present invention.

FIG. 8 is a block diagram showing a detailed configuration of the user information providing system according to the present embodiment. The configuration of the present embodiment is that, for the configuration of the second embodiment, the configuration of the digital multi-functional peripheral 20 is set to be the same as that of the first embodiment, and instead of the user information converting portion 206 of the digital multi-functional peripheral 20, a user information extracting portion 104 is added to the authenticating apparatus 10, and the same reference number is attached to one having the same function as that of the first embodiment and the second embodiment, and the description thereof is omitted and the difference is to be described.

The service providing apparatus 30 operates similarly in the second embodiment, and the user ID and the list of item names of the user information required by the service application are given to the digital multi-functional peripheral 20 (user information obtaining and receiving portion 204).

After that, the user information obtaining portion 303, when receiving the user information from the digital multi-functional peripheral 20 (user information obtaining and receiving portion 204), gives the user information to the service processing portion 302.

Next, the digital multi-functional peripheral 20 operates similarly in the first embodiment, but the user information obtaining and receiving portion 204 gives the user ID and the list of item names of the user information received from the service providing apparatus 30 to the user information obtaining and calling portion 205, and the user information obtaining and calling portion 205 delivers the user ID together with the list of item names of the user information received from the user information obtaining and receiving portion 204 to the authenticating apparatus 10 (user information providing portion 103).

After that, the digital multi-functional peripheral 20 gives the item of the user information required by the service application, which is received in the user information obtaining and calling portion 205, from the user information obtaining and receiving portion 204 to the service providing apparatus 30 (user information obtaining portion 303).

The user information extracting portion 104 of the authenticating apparatus 10 removes the item not included in the list of item names given from the user information providing portion 103 out of the user information related to the user ID given from the user information providing portion 103 with reference to the user information storage portion 101, so that conversion to only the information which is required by the service application side is performed (FIG. 7B) to return to the user information providing portion 103.

The user information providing portion 103 gives the user information given from the user information extracting portion 104 to the service providing apparatus 30 (user information obtaining portion 303) through the digital multi-functional peripheral 20.

Thereby, although the amount of data for user information obtaining requests between the digital multi-functional peripheral 20 and the authenticating apparatus 10 increases, there will be no sending out of the user information above the necessary amount from the authenticating apparatus 10 onto the network, and only the information required by the service application of the service providing apparatus 30 can be obtained, therefore, the amount of data as a whole is reduced compared with that in the second embodiment, and furthermore, it is possible to avoid a problem in the service application caused by transmitting unexpected data to the service providing apparatus 30 side or a problem of information leakage.

<Fourth Embodiment>

Figure 9:
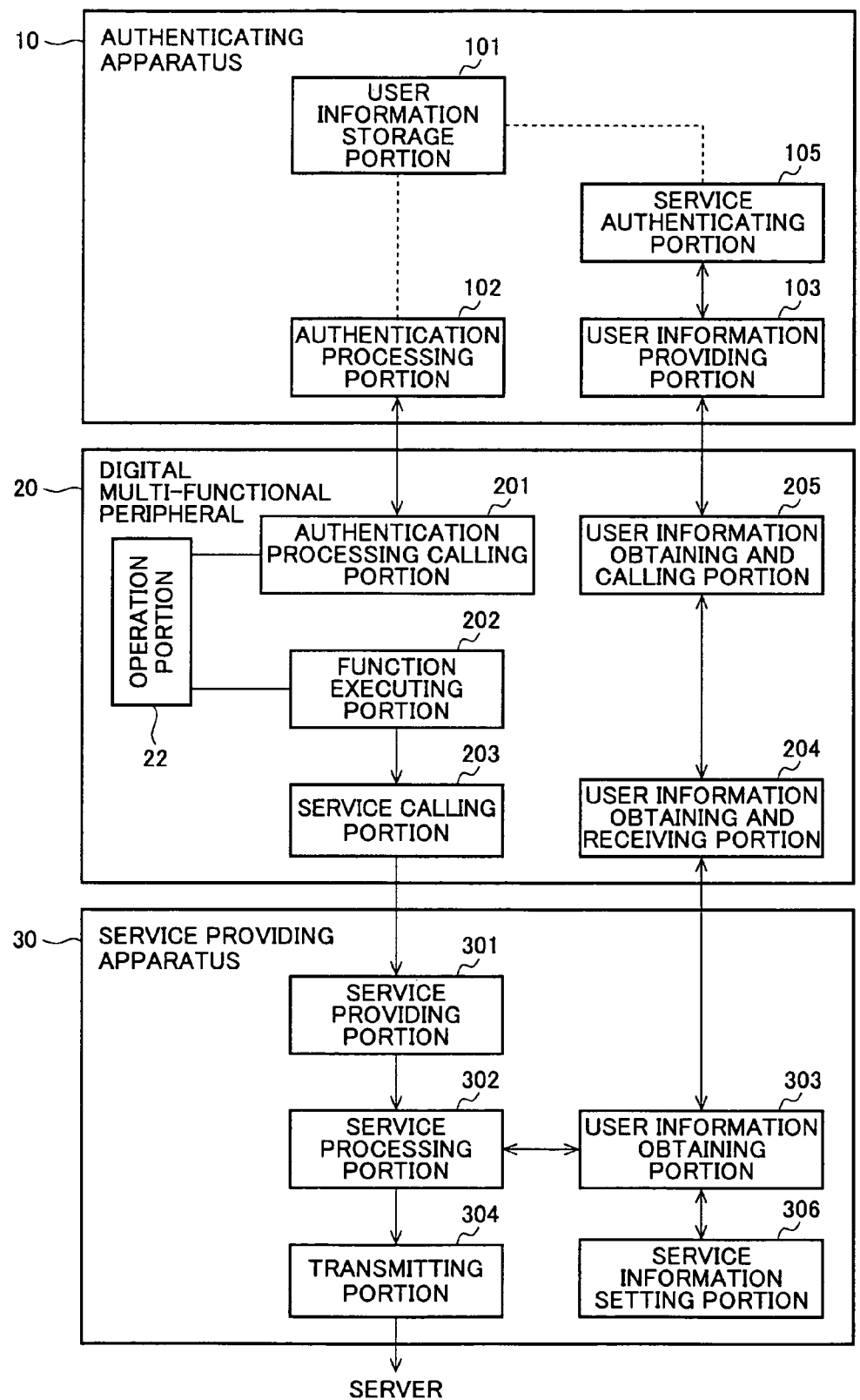
FIG. 9 is a block diagram showing a detailed configuration of the user information providing system according to a fourth embodiment of the present invention.

FIG. 9 is a block diagram showing a detailed configuration of the user information providing system according to the present embodiment. The configuration of the present embodiment is that, for the configuration of the first embodiment, a service authenticating portion 105 is added to the authenticating apparatus 10, a service information setting potion 306 is added to the service providing apparatus 30, and a same reference number is attached for one having a same function as that of the first embodiment, and the description thereof is omitted and the difference is to be described.

In the service providing apparatus 30, in requesting the user information from the user information obtaining portion 303, service identification information and the user ID obtained by calling the service information setting portion 306 from the user information obtaining portion 303 are added and the digital multi-functional peripheral 20 (user information obtaining and receiving portion 204) is called.

After that, the user information obtaining portion 303, when receiving the user information from the digital multi-functional peripheral 20 (user information obtaining and receiving portion 204), gives the user information to the service processing portion 302.

The above service identification information is the information including an identifier (service ID) for identifying the service application, and stored for each service application.

The service information setting portion 306 outputs the service identification information which the called service application stores.

Next, the digital multi-functional peripheral 20 operates similarly in the first embodiment, but the user information obtaining and calling portion 205 delivers the user ID together with the service identification information received from the service providing apparatus 30 to the authenticating apparatus 10 (user information providing portion 103).

After that, the digital multi-functional peripheral gives the user information received by the user information obtaining and calling portion 205 to the service providing apparatus 30 (user information obtaining portion 303) from the user information obtaining and receiving portion 204.

Next, in the authenticating apparatus 10, authentication information of the user, the user information and the service identification information accessible by the user are recorded in the user information storage portion 101 in advance in association with the identification information of the user.

Figure 10:
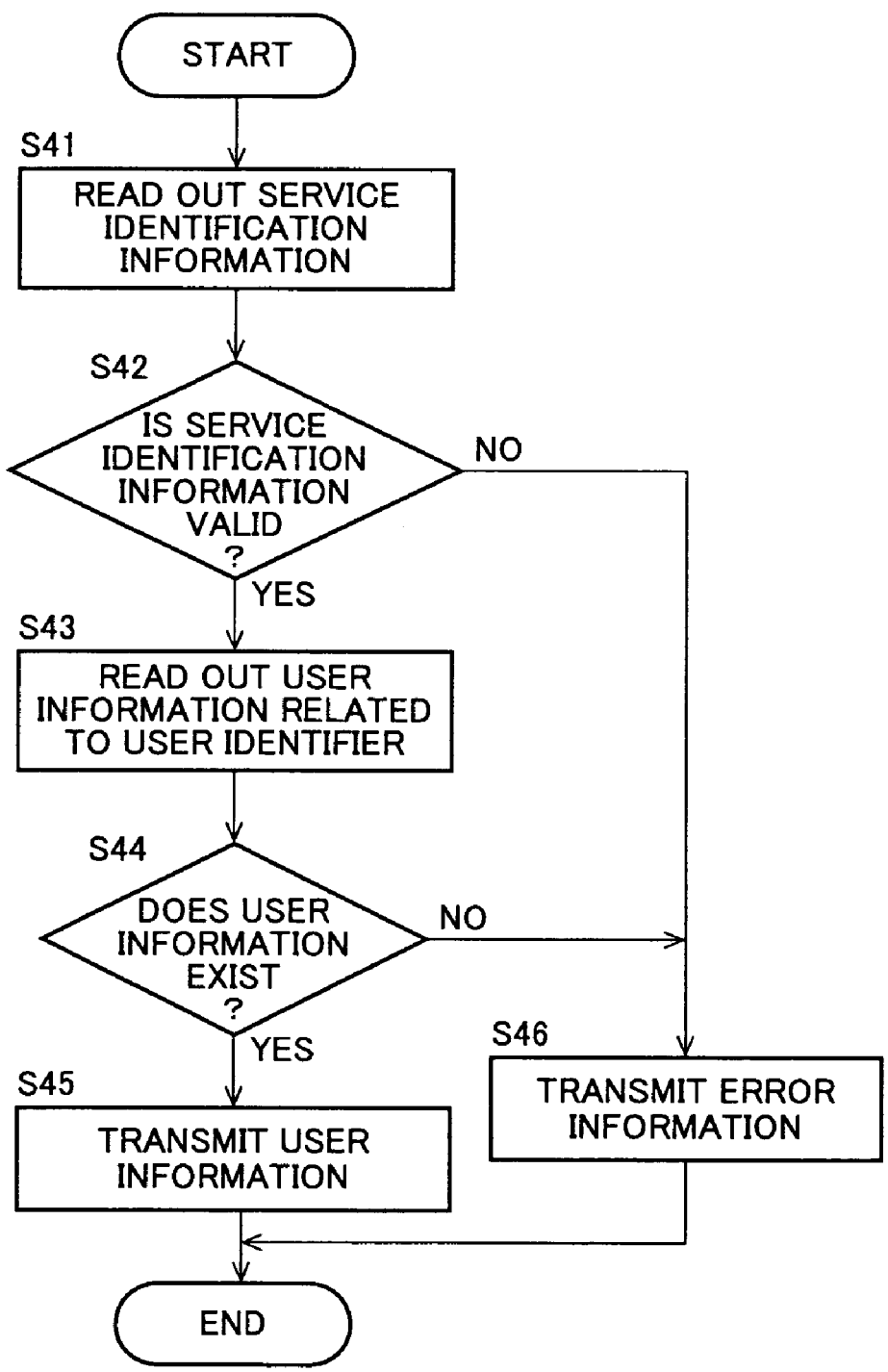
FIG. 10 is a flowchart showing an operation of a service authenticating portion.

When the service identification information given from the service providing apparatus 30 is stored in the user information storage portion 101 in association with the user ID, the service authenticating portion 105 extracts the user information associated with the user ID from the user information storage portion 101 as being the valid service for the user and gives it to the user information providing portion 103. The operation of the service authenticating portion 105 is described using the flowchart of FIG. 10.

First, the service identification information given from the user information providing portion 103 is taken out (step S41), and when the service identification information is not stored in association with the user ID in the user information storage portion 101 (in the case of NO at step S42), an error to the effect that "the service is not accessible by the user" is reported to the service providing apparatus 30 through the digital multi-functional peripheral 20 (step S46).

On the other hand, in the case of being stored (valid service) (in the case of YES at step S42), the user information related to the user ID given from the user information providing portion 103 is entirely extracted from the user information storage portion 101 (step S43).

When there is the user information related to the user ID (in the case of YES at step S44), the extracted user information is given to the user information providing portion 103 to give to the service providing apparatus 30 through the digital multi-functional peripheral 20 (step S45).

Furthermore, when there is no user information related to the user ID (in the case of NO at step S44), an error to the effect that "user information which the user has registered does not exist" is reported to the service providing apparatus 30 through the digital multi-functional peripheral 20 (step S46).

When judging whether or not the service in the service authenticating portion 105 described above is valid, not only judging of the service ID, but also a combination of a service ID and a password which have been recorded in advance may be used similarly to the user authentication.

Moreover, in the present embodiment, as in the second and third embodiments, it may be configured such that an item required by the service providing apparatus 30 for the service application is set, and only the item required for the service application in the digital multi-functional peripheral 20 and the authenticating apparatus 10 is obtained out of the user information.

In addition, when the user information is recorded in the user information storage portion 101, an attribute of a service ID is attached to each item, or each item is classified by a service ID, and in the service authenticating portion 105, the user information comprised of only the item corresponding to the service ID may be extracted.

In this manner, even in a case of the present invention where the authenticating apparatus 10 and the service providing apparatus 30 do not perform direct communication, authentication between the apparatuses through the service identification information is possible, and thereby it is possible to prevent a theft of the user information by spoofing through the digital multi-functional peripheral 20.

<Fifth Embodiment>

Figure 11:
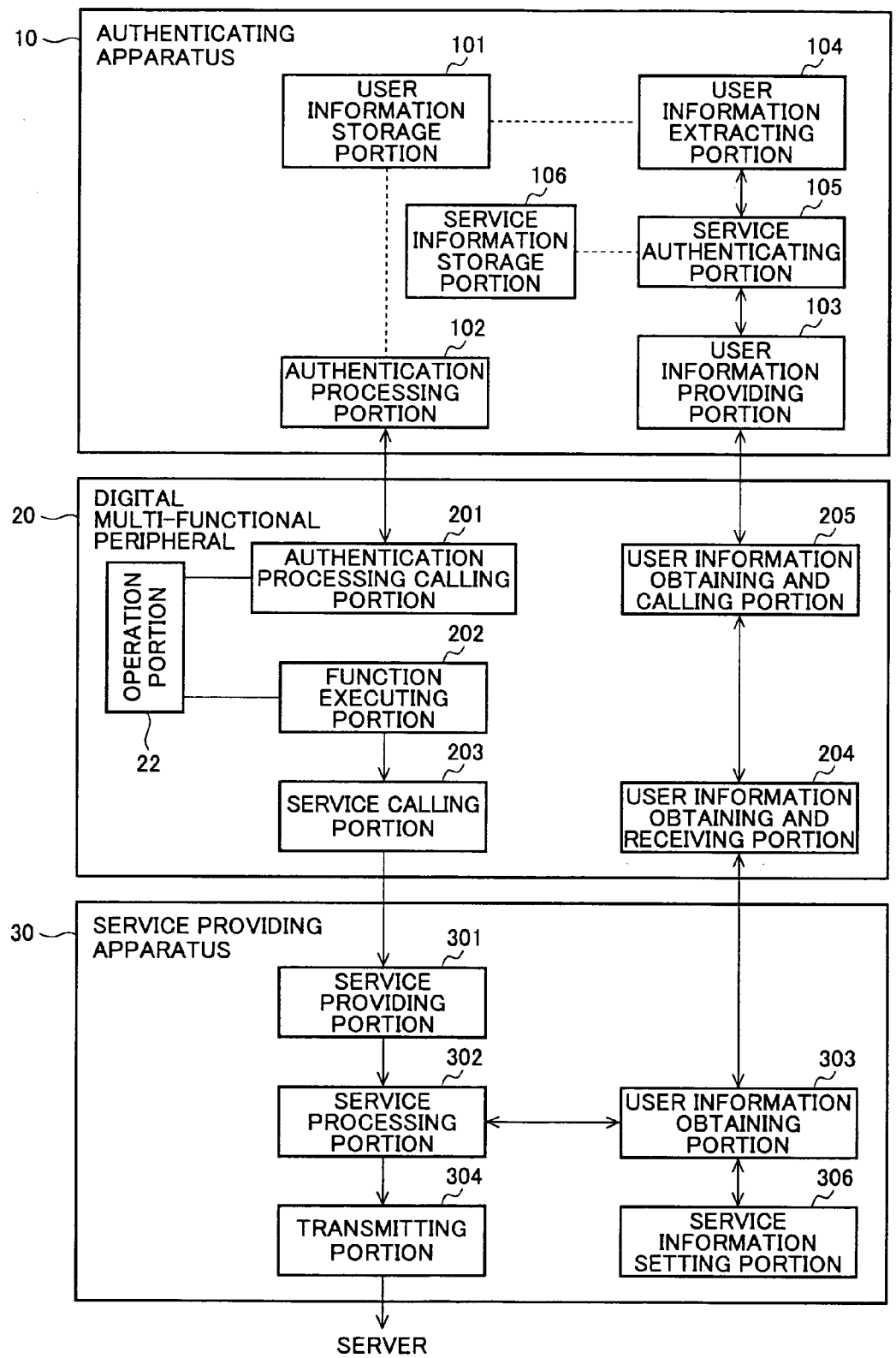
FIG. 11 is a block diagram showing a detailed configuration of the user information providing system according to a fifth embodiment of the present invention.

FIG. 11 is a block diagram showing a detailed configuration of the user information providing system according to the present embodiment. The configuration of the present embodiment is that, for the configuration of the fourth embodiment, the user information extracting portion 104 in the third embodiment is added to the authenticating apparatus 10, and the same reference number is attached for one having the same function as that of the fourth embodiment and the third embodiment, and the description thereof is omitted and the difference is to be described.

A service information storage portion 106 of the authenticating apparatus 10 holds, for each service, service identification information and all the items required by the service in association therewith.

When the service identification information given from the service providing apparatus 30 is stored in the user information storage portion 101 in association with the user ID, the service authenticating portion 105 obtains all the items associated with the service identification information to deliver to the user information extracting portion 104 together with the user ID.

The user information extracting portion 104 extracts the user ID and the user information including only the items required by the service application based on all the items associated with the service identification information, similarly to the third embodiment, the extracted user information is passed to the user information providing portion 103 through the service authenticating portion 105 to pass to the service providing apparatus 30 (user information obtaining portion 303) through the digital multi-functional peripheral 20.

Thereby, with only adding the service identification information from the service providing apparatus, it is possible to control the item of the user information that the authenticating apparatus provides, and to provide the user information corresponding to a separate service.

Moreover, even in a case where the service identification information is leaked and the spoofing is successful, only the limited information is provided by the authenticating apparatus and therefore damage from the user information leakage can be reduced.

In addition, the present invention is not limited to the above-described embodiments, and various modifications and corrections are of course possible within a range without departing from the scope of the present invention.

According to the invention, the authentication information of the user and the individual information are integrally managed by the authenticating apparatus, and these pieces of information can be used only through the digital multi-functional peripheral, and thereby the authentication information is concealed from the service providing apparatus as well as same user information is usable even though the service providing apparatus is operated from any digital multi-functional peripheral.

The invention claimed is:

1. A user information providing system, comprising:
   at least one multi-functional peripheral;
   a service providing apparatus which works with the multi-functional peripheral; and
   an authenticating apparatus which performs user authentication, the authenticating apparatus being connected through a network to the multi-functional peripheral and the service providing apparatus, and when the service providing apparatus is utilized through the multi-functional peripheral, user authentication is performed and user information is provided to the service providing apparatus,
   the authenticating apparatus, associating with identification information of a user in advance, holds authentication information of the user and the user information, performs user authentication based on input of the authentication information of the user for the multi-functional peripheral, transmits the identification information of the user to the multi-functional peripheral by authentication, and is allowed access to the service providing apparatus through the multi-functional peripheral by receiving the identification information,
   the service providing apparatus, by receiving a service request from the multi-functional peripheral and the identification information, transmits the identification information to the authenticating apparatus through the multi-functional peripheral, and thereby obtains the user information transmitted from the authenticating apparatus through the multi-functional peripheral, wherein the service providing apparatus receives only the user information corresponding to a display name and an electronic mail address of the user, without receiving the authentication information of the user,
   the service providing apparatus, when requesting the user information, further transmits service identification information which identifies a service which is provided by the service providing apparatus together with the identification information of the user to the authenticating apparatus through the multi-functional peripheral, and
   the authenticating apparatus further holds the service identification information which is accessible by the user by associating with the identification information of the user in advance, and when the service identification information received from the service providing apparatus is held in association with the identification information of the user, sends back the user information related to the identification information of the user to the service providing apparatus through the multi-functional peripheral.

2. The user information providing system as defined in claim 1, wherein
   the service providing apparatus, when receiving image data read from the multi-functional peripheral, a request of image reading and transmitting service, and the identification information, transmits the identification information to the authenticating apparatus through the multi-functional peripheral, and thereby obtains the electronic mail address of the user transmitted from the authenticating apparatus through the multi-functional peripheral and an electronic mail address of a transmitting destination, sets a transmitter address of image reading and transmitting service to the electronic mail address of the user, and transmits the image data to the electronic mail address of the transmitting destination.

3. The user information providing system as defined in claim 2, wherein
   the authenticating apparatus obtains the electronic mail address of the user from an LDAP server based on user account information corresponding to the identification information.

4. The user information providing system as defined in claim 1, wherein
   the service providing apparatus holds item information which identifies an item which is required by the service providing apparatus, and when requesting the user information, transmits the identification information of the user and the item information to the multi-functional peripheral, and
   the multi-functional peripheral extracts the user information corresponding to the item information from the user information received from the authenticating apparatus, and sends it back to the service providing apparatus.

5. The user information providing system as defined in claim 1, wherein
   the service providing apparatus holds item information which identifies an item which is required by the service providing apparatus, and when requesting the user information, transmits the identification information of the user and the item information to the authenticating apparatus through the multi-functional peripheral, and
   the authenticating apparatus extracts the user information corresponding to the item information from the user information related to the identification information of the user received from the service providing apparatus, and sends it back to the service providing apparatus through the multi-functional peripheral.

6. The user information providing system as defined in claim 1, wherein
   the authenticating apparatus holds an item to be provided corresponding to the service by associating with the service identification information in advance, and when the service identification information received from the service providing apparatus is held in association with the identification information of the user, extracts the item associated with the service identification information from the user information related to the identification information of the user, and sends it back to the service providing apparatus through the multi-functional peripheral.

7. The user information providing system as defined in claim 1, wherein
   the service providing apparatus holds item information which identifies an item which is required by the service providing apparatus, and when requesting the user information, further transmits the item information to the multi-functional peripheral, and
   the multi-functional peripheral extracts the user information corresponding to the item information from the user information received from the authenticating apparatus, and sends it back to the service providing apparatus.

8. The user information providing system as defined in claim 1, wherein
   the service providing apparatus holds item information which identifies an item which is required by the service providing apparatus and when requesting the user information, further transmits the item information to the authenticating apparatus through the multi-functional peripheral, and
   the authenticating apparatus extracts the user information corresponding to the item information from the user information related to identification information of the user received from the service providing apparatus, and sends it back to the service providing apparatus through the multi-functional peripheral.

* * * * *